(12) United States Patent
Allen et al.

(10) Patent No.: US 10,671,316 B2
(45) Date of Patent: *Jun. 2, 2020

(54) SYSTEM, METHOD, AND RECORDING MEDIUM FOR ALIGNMENT OF BACKUP AND ARCHIVAL POLICY

(71) Applicant: International Business Machines Corporation, Armonk, NY (US)

(72) Inventors: Carmen P. Allen, Yorktown Heights, NY (US); Jarir Kamel Chaar, Ardsley, NY (US); Bernhard Julius Klingenberg, Grover Beach, CA (US); Radha P. Ratnaparkhi, Ridgefield, CT (US); Robert Michael Rees, Los Gatos, CA (US); Ramani Ranjan Routray, San Jose, CA (US); Dinesh C. Verma, New Castle, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,866

(22) Filed: Jan. 2, 2019

(65) Prior Publication Data

US 2019/0138215 A1     May 9, 2019

Related U.S. Application Data

(63) Continuation of application No. 15/226,347, filed on Aug. 2, 2016, now Pat. No. 10,254,997.

(51) Int. Cl.
*G06F 3/06*        (2006.01)

(52) U.S. Cl.
CPC ............ *G06F 3/065* (2013.01); *G06F 3/0604* (2013.01); *G06F 3/067* (2013.01); *G06F 3/0649* (2013.01)

(58) Field of Classification Search
CPC ......... G06F 3/065; G06F 3/0604; G06F 3/067
See application file for complete search history.

(56) References Cited

U.S. PATENT DOCUMENTS

| | | | |
|---|---|---|---|
| 7,287,048 B2 | 10/2007 | Bourbonnais et al. |
| 8,234,464 B2 | 7/2012 | Bish et al. |
| 8,484,737 B1 | 7/2013 | Swift et al. |
| 8,589,439 B2 | 11/2013 | Coldicott et al. |
| 9,246,752 B2 | 1/2016 | Holst et al. |
| 9,384,051 B1 | 7/2016 | Chopra et al. |

(Continued)

OTHER PUBLICATIONS

United States Notice of Allowance dated Nov. 29, 2018, in U.S. Appl. No. 15/226,347.

(Continued)

*Primary Examiner* — Prasith Thammavong
*Assistant Examiner* — Edmund H Kwong
(74) *Attorney, Agent, or Firm* — Kevin Michael Jordan, Esq.; McGinn I.P. Law Group, PLLC.

(57) ABSTRACT

A backup and archival policy method, system, and non-transitory computer readable medium, includes performing correlation analytics to determine identification of a backup policy aligned with a criticality of operational data and backup data including identifying low value backup data having a value less than a predetermined low value threshold, creating a one-time archival of the operational data and the backup data including the low value backup data, and removing the low value backup data from a future data protection policy.

6 Claims, 4 Drawing Sheets

BACKUP AND ARCHIVAL POLICY METHOD 100

(56) References Cited

U.S. PATENT DOCUMENTS

| | | |
|---|---|---|
| 2010/0293147 A1 | 11/2010 | Snow et al. |
| 2013/0262418 A1 | 10/2013 | Bhasin et al. |
| 2015/0261776 A1 | 9/2015 | Attarde et al. |

OTHER PUBLICATIONS

United States Office Action dated Aug. 24, 2018, in U.S. Appl. No. 15/226,347.

United States Office Action dated Apr. 24, 2018 in U.S. Appl. No. 15/226,347.

Mel, et al. "The NIST Definition of Cloud Computing". Recommendations of the National Institute of Standards and Technology, Nov. 16, 2015.

QuickSpecs HP StoreOnce D2D Backup Systems, DA 13218 Worldwide-Version 20—Feb. 22, 2013 (Year: 2013).

Keeton, K. & Merchant, A. (2006). Challenges in Managing Dependable Data systems. ACM SIGMETRICS Performance Evaluation Review. 33(4), 4-10.

SYSTEM, METHOD, AND RECORDING MEDIUM FOR ALIGNMENT OF BACKUP AND ARCHIVAL POLICY

CROSS-REFERENCE TO RELATED APPLICATIONS

The present application is a Continuation Application of U.S. patent application Ser. No. 15/226,347, filed on Aug. 2, 2016, the entire contents of which are hereby incorporated by reference.

BACKGROUND

The present invention relates generally to a backup and archival policy method, and more particularly, but not by way of limitation, to a system, method, and recording medium for analyzing data under a backup system and subsequently performing correlation analytics on data classification results and a backup policy to transform data protection for an enterprise.

Ninety-percent of the data in the world was created in the last two years, and data volumes are rising faster than storage price is declining. Therefore, cheap storage is no longer the only answer to controlling the costs associated with data growth and backup policies. Data classification analytics can play an important role in discovering, recognizing, and subsequently acting on data in-place to transform a modern day enterprise to be data-driven by identifying relevant data. Conventional data classification processes help with finding the data that matters eventually leading to the outcome of getting rid of old, obsolete data and identifying sensitive content.

However, data classification analysis has been conventionally limited to the domain of operational data—from the domain of active file systems, active applications, such as E-mail, document management systems, content management systems, etc. Significant amount of similar irrelevant data gets accumulated in a data protection system historically based on the backup and retention policy of the data protection system (it is noted that "backup" and "data protection" are used interchangeably and mean substantially the same in the context of this application).

Conventionally, backup of data or data protection is done because the user wants to protect the enterprise from physical or online data corruption. As an enterprise, a backup policy is specified such as a daily or weekly backup policy. The policy scans all the files to see if a file was updated. If the file was updated, the policy creates a backup of the file and if the file was not updated, a backup is not created for the file.

SUMMARY

In view of the above, the inventors have identified a technical problem in the conventional techniques that data classification does not analyze and focus on the classification of data in the data protection workflow due to the proprietary nature of the storage format of the data protection workflow. Also, a systematic analysis of backup policy needs to be implemented to the enterprise to de-clutter the backup system, reinforce to curtail the development of data debris in the backup system, and reduce the data center storage and networking costs incurred by data protection. Thus, the inventors have identified the technical problem with the conventional techniques that the techniques do not look at a value of the data such as specific keywords or the like to find a sensitivity of the file and does not look at the incremental behavior of the data based on archival rules (e.g., every back-up interval, the file is scanned to see if the file was updated). As a result of the technical problem, the backup time is greatly increased and the backup procedure is costly.

Thus, the inventors have realized a technical solution to the technical problem by harnessing critical parameters obtained from infrastructure configurations and performance metrics, data relevance metrics from data classification analysis, and backup policy capturing backup-domain, associated backup policies, and retention policies to generate output that empowers an improved data protection workflow to support the automated removal of data from the backup rotation (e.g., remove less important or less updated data from being scanned to be backed-up), create a one-time archival of data and de-cluttering of the backup rotation (e.g., fix the backup plan and optimize past data), cleanup of data debris accumulated in the backup system, and to reduce backup stream costs by transforming the file-by-file network based backup for certain data to controller-based replication.

In an exemplary embodiment, the present invention can provide a backup and archival policy method, the method including harnessing of metrics of data classification including both operational data and backup data from an end-to-end stack from a backup Information Lifecycle Governance (ILM) viewpoint.

Further, in another exemplary embodiment, the present invention can provide a non-transitory computer-readable recording medium recording a backup and archival policy program, the program causing a computer to perform: harnessing of metrics of data classification including both operational data and backup data from an end-to-end stack from a backup Information Lifecycle Governance (ILM) viewpoint.

Even further, in another exemplary embodiment, the present invention can provide a backup and archival policy system, said system including a processor, and a memory, the memory storing instructions to cause the processor to: harness metrics of data classification including both operational data and backup data from an end-to-end stack from a backup Information Lifecycle Governance (ILM) viewpoint.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
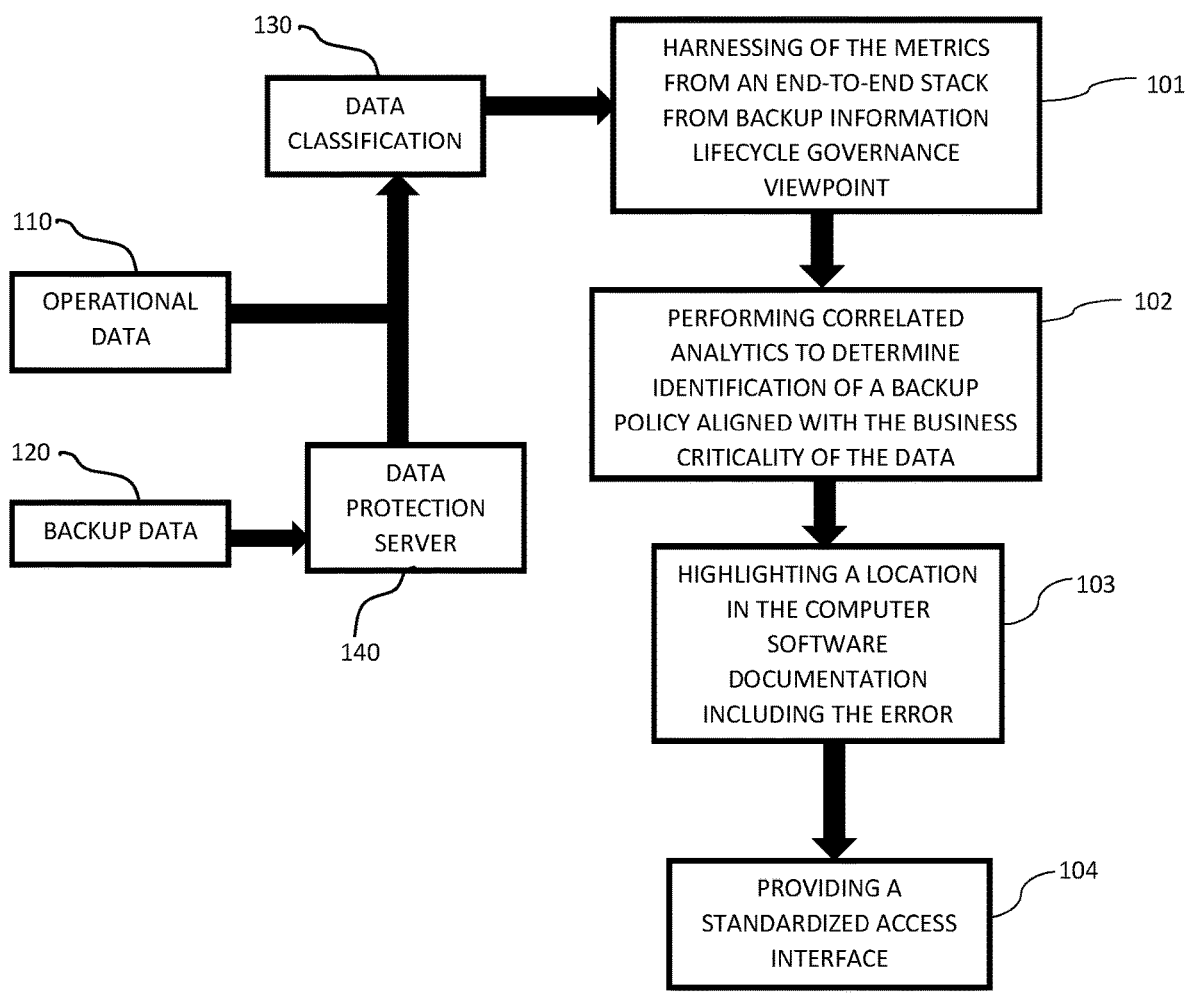
FIG. 1 exemplarily shows a high-level flow chart for a backup and archival policy method 100.

The invention will now be described with reference to FIGS. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the backup and archival policy method 100 includes various steps to harness critical parameter's from an end-to-end stack (e.g., infrastructure, data, and backup) from a backup Information Lifecycle Governance (ILM) viewpoint, perform correlation analytics to determine an identification of a backup policy aligned with the business criticality of data, modify backup policy to align the data protection with the business relevance of data, and provide a standardized access interface for backup data similar to the operation data. As shown in at least FIG. 2, one or more computers of a computer system 12 can include a memory 28 having instructions stored in a storage system to perform the steps of FIG. 1.

With the use of these various steps and instructions, the backup and archival policy method 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Although as shown in FIG(S). 2-4 and as described later, the computer system/server 12 is exemplarily shown as one or more cloud computing nodes 10 of the cloud environment 50 as a general-purpose computing circuit which may execute in a layer the backup and archival policy system method (FIG. 3), it is noted that the present invention can be implemented outside of the cloud environment.

The backup and archival policy method 100 receives a backup policy and retention rules from the data protection server 140 and a value of data (e.g., data relevance) from the data classification 130 of both operational data 110 and backup data 120.

Operational data comprises actively written and read data. For example, multiple applications can be run on a plurality of servers and the plurality of servers can use a certain amount of storage. Operational data comprises the day-to-day used data on a computer.

Backup data is different from the operational data in that the backup data is the archived data from the operational data based on the backup policy and retention policy (e.g., backup rules). For example, operational data comprises the data on a "drive" on a personal computer while the backup data comprises the archived data of the drive based on an archival policy.

The data protection server 140 includes the backup policy and retention policy of the backup data. For example, the backup policy or retention policy can be rules such as excluded backup of the operating system files or files older than a year, etc.

The data classification 130 includes classified data from the partitioned data (e.g., the operational data 110 and the backup data 120) based on a value of the data. The data is classified by making a pointer of the two points to the data set, scans different files of different formats, looks for different rules, and figures out the files that contain the critical information based on keywords or a specific rule set by the user (e.g., copyrighted files, social security numbers, etc.). Any document that contains the particular keyword or triggers the rule, is classified accordingly. Both the operational data and the backup data is classified as part of the data classification 130 input to the method 100.

Step 101 harnesses the metrics (e.g., critical parameters) of the data classification 130 from an end-to-end stack (e.g., from infrastructure, operational data 110, and backup data 120) from a backup Information Lifecycle governance (ILM) viewpoint. That is, Step 101 obtains the application metrics of how the application is laid out in the operational data 110 such as application(s) (e.g., different e-mail applications) to server (e.g., different servers for the e-mail applications) to storage(s) (e.g., different types of storage for each e-mail) to block(s), tile(s), or object(s) and then identifies the value of the data based on the data classification 130. Step 101 then does a similar value identifying on the backup data 120 and then correlates the value of the operational data 110 and the backup data 120 by harnessing of the metrics from an end-to-end stack. Thus, Step 101 identifies the application, the classification of the data, the portion of the data that is backed up, and how relevant the data is.

For example, each enterprise runs a different setup that needs to be harnessed front an end-to-end stack such as running in a cloud environment and each enterprise specifies the applications that they are using metrics such as a first type of e-mail, a second type of e-mail, and a third type of e-mail, the type of storage available such as 200 gigabytes, 200 terabytes, etc.

Step 101 harnesses the data from a value-to-value perspective and harnesses metrics such that Step 101 identifies the data, the application of the data, how much business value that the data has based on a backup rule, what is the correlation of the data with respect to backup (e.g., protection or no protection) such that the metrics are harnessed in an end-to-end stack perspective.

Step 102 performs correlated analytics to determine identification of a backup policy aligned with the business criticality of the data. For example, Step 102 crawls the operational data and if a predetermined amount of data has debris based on the data classification (e.g., data having a low value) that is getting backed up based on an equal policy with data being significant that should be being backed up and Step 102 correlates the information to align the backup policy with the business criticality of data. Further, Step 102 can cause a one-time backup of the data having debris to ensure that the data is protected and then no longer backing up the data having debris.

In other words, Step 102 aligns the backup policy with the actual value of the data such that the backup policy no longer includes the data having debris in the backup policy.

For example, a typical e-mail backup policy creates a backup of all e-mails within a particular time frame. Step 102 can align the backup policy of the e-mails with the business criticality of data so as to no longer back up data having debris such as out of office e-mail responses or similar e-mails with little value.

That is, Step 102 identifies the backup policy and correlates the backup policy with what has been done to the files in the past (e.g., previously backed up files in the backup data 120). Therefore, even without modifying the backup policy (as described in Step 103), Step 102 can identify the backup policy to identify which data has no value (e.g., identify the backup value in terms of business value) and perform a clean-up on the backup data 120 based on the identified backup policy as aligned with the business value (e.g., remove data in the backup data 120 having no value to the business).

Step 102 identifies the value of each data of the data types (e.g., the operation data 110 and the backup data 120) with the backup policy and perform a cleanup to filter the backup data 110 by deleting data that has no value based on the backup policy to business criticality of the data alignment, and also delete data that has already been backed up.

For example, if the backup policy has backed up "out of office e-mails" for the past five years, Step 102 identifies that the out of office e-mails have no value by performing correlation analytics to determine identification of the backup policy aligned with the business criticality of data and then removes (deletes) all of the backup data 120 for the out of office e-mails to "clean" the backup data, thereby, freeing up space for business relevant data in the future.

Step 103 modifies the identified backup policy to align the data protection (e.g., a future backup of data) of the backup policy with the business relevance of data. In other words, Step 103 aligns the backup policy to appropriately backup data based on the value of the data for future backup operations. Thus, data having low value such as out of office e-mails or data debris does not need to be scanned when the backup is performed according to the backup policy which can greatly reduce the amount of data needed to be backed up as well as the time to backup by reducing the amount of data needed to be scanned to determine if the data was updated.

It is noted that Step 102 "cleans up" the backup data 120 currently backed up based on identifying the backup policy aligned with the value of the data to the business and Step 103 modifies the backup policy such that all future backups align the value of the data with the business so that the backup data 120 will not need to be "cleaned up" again. In other words, Step 102 is preferably a one-time clean up because Step 103 modifies the backup policy such that a clean-up would not need to be performed again.

Thus, Step 102 filters through the data based on the identified value of data aligned with the backup policy to reduce the size of the backup data 120 while Step 103 prevents the backup data 120 from including data with no business value by modifying the backup policy.

Step 104 provides a standardized access interface for the backup data 120 similar to the operational data 110 interface. For example, operation data 110 is easily accessible (e.g., such as using Windows™ or Linux™) but backup data 120 does not have a standardized access interface to view the backup data 120. For example, standard Notes® database (NSF) to Tivoli Storage Manager (TSM) can be provided.

Thus, the steps of the method 100 generate an output that empowers an enterprise with actionable insights to support the automated removal of data from the backup rotation, perform a one-time archival of data and de-cluttering of the backup rotation (e.g., identified data created once and will not change such that the data does not need to be re-archived every time in the backup policy), clean-up data debris accumulated in the backup data, and reduce backup stream costs by transforming the file-by-file network based on backup for certain data to controller-based replication (e.g., Step 102 can identify when the backup policy is no longer efficient because of the amount of data needed to be backed up).

Exemplary Hardware Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country; state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models arc as Follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
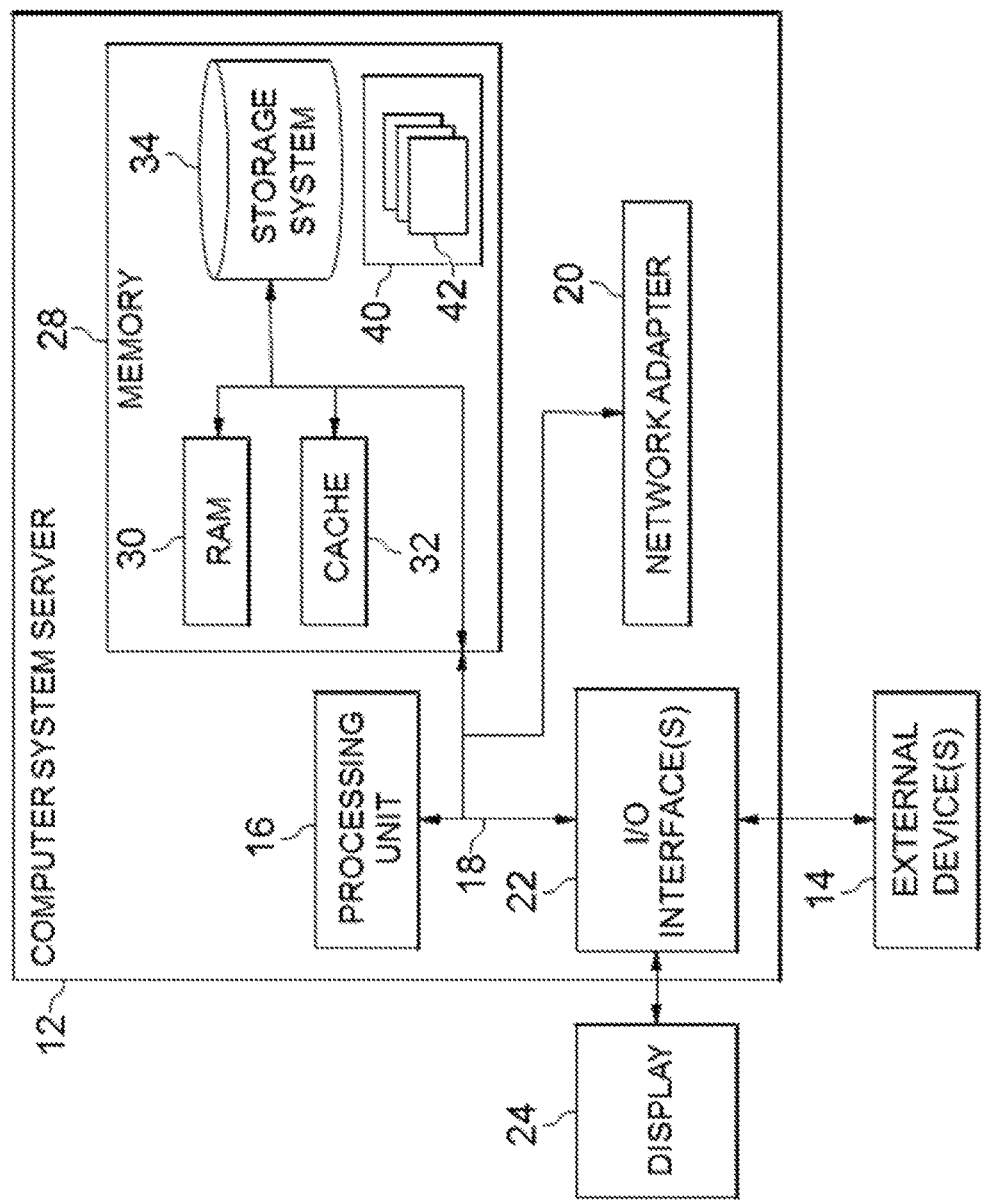
FIG. 2 depicts a cloud computing node according to an embodiment of the present invention.

Referring now to FIG. 2, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 2, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
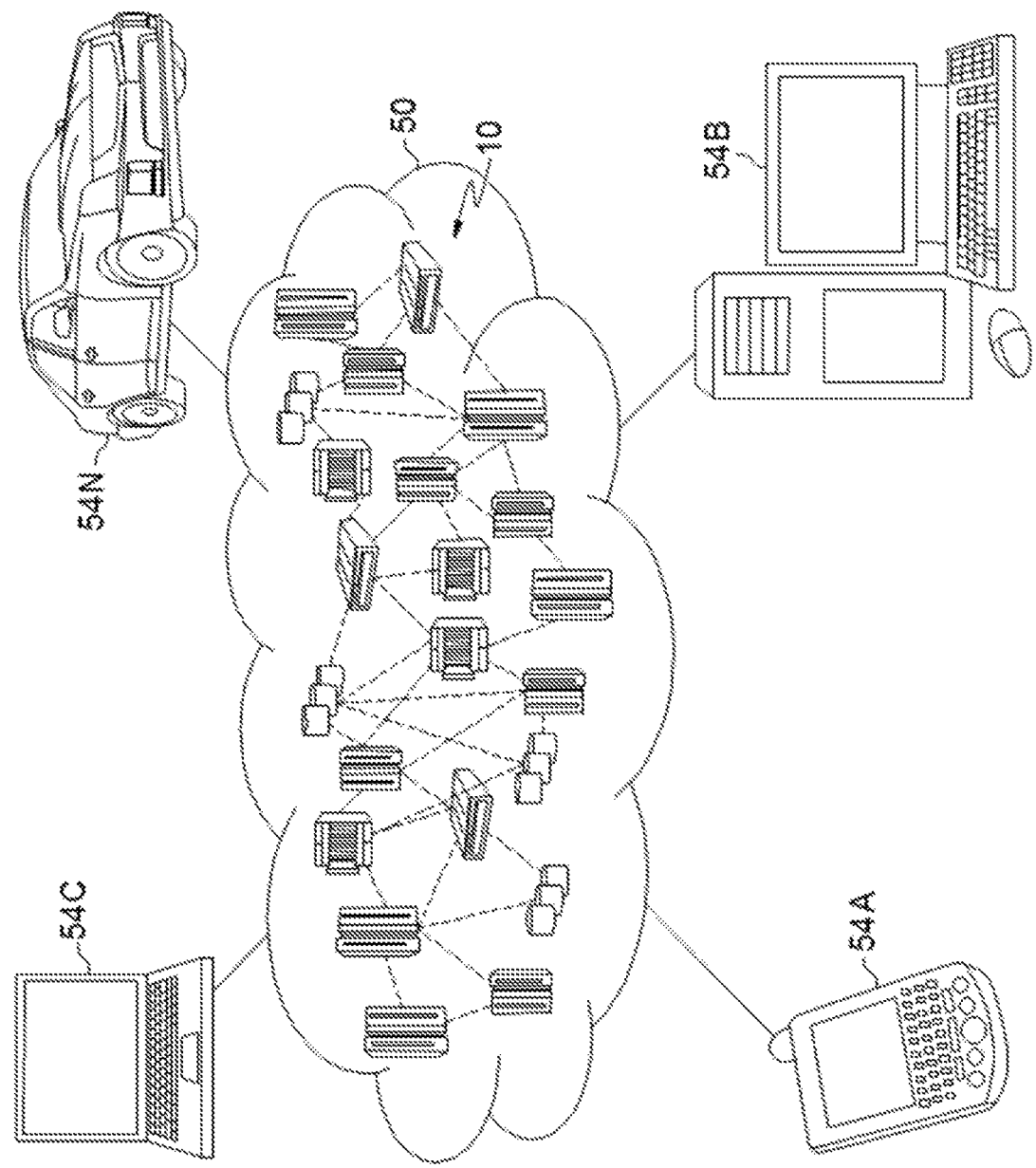
FIG. 3 depicts a cloud computing environment according to another embodiment of the present invention.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
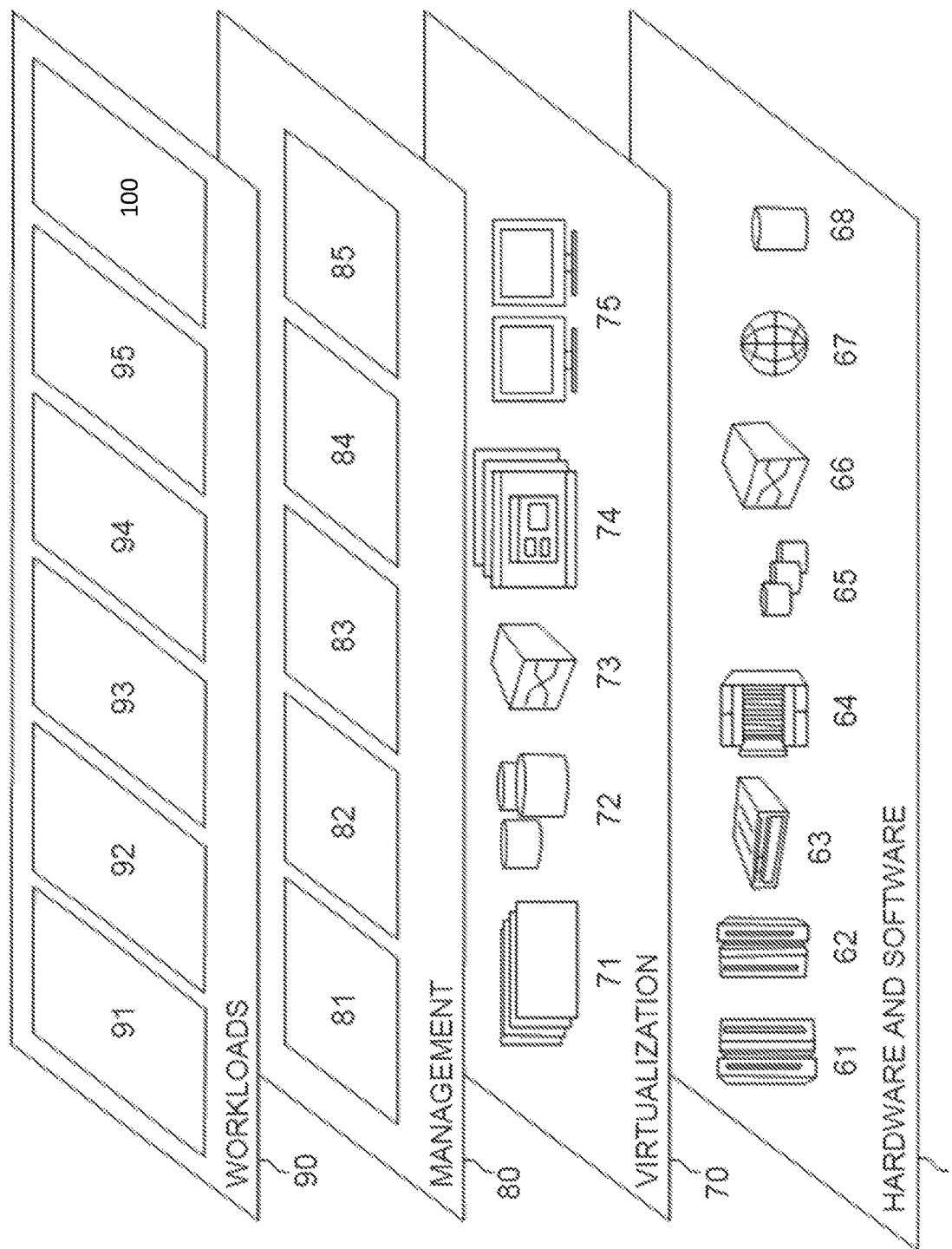
FIG. 4 depicts abstraction model layers according to an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the backup and archival policy method 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A backup and archival policy method, the method comprising:
   performing correlation analytics to determine identification of a backup policy aligned with both a criticality of operational data and backup data, wherein the correlation analytics includes identifying low value backup data having a value less than a predetermined low value threshold;
   creating a one-time archival of the operational data and the backup data including the low value backup data; and
   modifying the backup policy by removing the low value backup data from a future data protection policy.

2. A non-transitory computer-readable recording medium recording a backup and archival policy program, the program causing a computer to perform:
   performing correlation analytics to determine identification of a backup policy aligned with both a criticality of operational data and backup data, wherein the correlation analytics includes identifying low value backup data having a value less than a predetermined low value threshold;
   creating a one-time archival of the operational data and the backup data including the low value backup data; and
   modifying the backup policy by removing the low value backup data from a future data protection policy.

3. A backup and archival policy system, said system comprising:
   a processor; and
   a memory, the memory storing instructions to cause the processor to perform:

performing correlation analytics to determine identification of a backup policy aligned with both a criticality of operational data and backup data, wherein the correlation analytics includes identifying low value backup data having a value less than a predetermined low value threshold;

creating a one-time archival of the operational data and the backup data including the low value backup data; and modifying the backup policy by removing the low value backup data from a future data protection policy.

4. The method of claim 1, wherein the performing further performs a clean-up of current data in the backup data according to the aligned backup policy and the criticality of the operational data and the backup data.

5. The method of claim 1, wherein the performing aligns the backup policy with the criticality of the operational data and the backup data such that backup data is cleaned of the low value backup data.

6. The method of claim 1, wherein the performing identifies the criticality of each data file of the operational data and the backup data aligned with the backup policy to perform a cleanup, thereby to filter the low value backup data by deleting the data that has the criticality of the operational data and the backup data less than a predetermined value.

* * * * *